United States Patent [19]

Miyoshi et al.

[11] Patent Number: 4,526,738
[45] Date of Patent: Jul. 2, 1985

[54] POLYESTER FIBER AND METHOD FOR THE PRODUCTION THEREOF

[75] Inventors: Takehiko Miyoshi, Mishima; Tadayuki Matsumoto, Otu; Keizo Sano, Musashino, all of Japan

[73] Assignee: Toray Industries, Inc., Tokyo, Japan

[21] Appl. No.: 512,206

[22] Filed: Jul. 8, 1983

[30] Foreign Application Priority Data

Jul. 9, 1982 [JP] Japan .............................. 57-118440

[51] Int. Cl.$^3$ .................... D01D 11/06; C08G 63/70; B28B 3/20
[52] U.S. Cl. .................................. 264/176 F; 264/18; 264/177 F; 264/210.6; 264/340; 528/272; 528/275; 528/279; 528/285; 528/286
[58] Field of Search ............... 528/272, 275, 285, 286, 528/279, 295; 264/176 F, 177 F, 78, 210.6, 340

[56] References Cited

U.S. PATENT DOCUMENTS

| | | | |
|---|---|---|---|
| 3,088,956 | 5/1963 | Horn et al. | 528/295 X |
| 3,816,486 | 6/1974 | Vail | 528/295 |
| 3,899,470 | 8/1975 | McGee et al. | 528/295 |
| 4,403,094 | 9/1983 | Sasaki et al. | 528/295 X |
| 4,415,726 | 11/1983 | Tanji et al. | 528/272 |
| 4,426,516 | 7/1984 | Kuriki et al. | 528/272 |

*Primary Examiner*—Lucille M. Phynes
*Attorney, Agent, or Firm*—Austin R. Miller

[57] ABSTRACT

A polyester fiber having a tenacity of at least 4.0 g/d is formed from a copolyester having a degree of polymerization of from 80 to 100 of which copolyester 1.0 to 2.0 mol % of its acid component has a metal sulfoisophthalic group and 0.5 to 1.9 weight % of which copolyester is provided by a glycol component provided by glycol having a molecular weight of from 400 to 6000. The polyester fiber is readily dyed with basic dyes.

The polyester fiber can be prepared by spinning the copolyester at a shear rate of $\leq 10^4$ sec$^{-1}$, a spinning draft ratio of $\leq 250$, a back pressure of the spinneret of $\geq 40$ kg/cm$^2$ and a shear stress of $\leq (Q+0.7) \times 10^7$ dyne/cm$^2$, where Q is the mass output rate per single hole (g/min).

12 Claims, 1 Drawing Figure

FIG. 1

POLYESTER FIBER AND METHOD FOR THE PRODUCTION THEREOF

FIELD OF THE INVENTION

The present invention relates, in one aspect, to improved polyester fiber dyeable with basic dyes, and, in another aspect, to a method for producing the improved polyester fiber. More particularly, it relates, in one aspect, to improved polyester fiber having high tenacity, being excellent in dyeability, especially with basic dyes, and in alkali resistance, and false-twisted yarns of which are excellent in crimp rigidity, and dyed fabrics of which are excellent in depth of color, light resistance, alkali resistance and hand, and, in another aspect, to a method for producing the improved polyester fiber.

BACKGROUND OF THE INVENTION

A method for producing a polyester fiber dyeable with basic dyes is known from Japanese Patent Publication No. 10497/1959 wherein the polyester fiber is produced from an aromatic polyester copolymerized with a compound having acid groups such as 5-sodium sulfoisophthalic acid. However, in this method, in order to satisfy the dyeability requirement, a large amount of acid component having the metal-sulfoisophthalic group hereinafter called ("S-Component") must be copolymerized. However the S component has the effect of increasing melt viscosity, so that the melt viscosity of a polyester containing a large amount of S-component and having a degree of polymerization sufficiently high to enable formation of a filament therefrom will become too high to enable the polyester to be spun in a conventional manner. Therefore, in order to spin the polyester containing a large amount of S-component in a conventional manner, it is usual that, in practice, its degree of polymerization is decreased in order to decrease the melt viscosity.

In this specification, the term "polymerization degree" is defined by the following equation:

$$\text{polymerization degree} = \frac{2 \times 10^6}{Ne \times Wa}$$

wherein Ne = Number of end groups per $10^6$ g based on the polyester, and Wa = Average molecular weight of each repeating unit in polyester.

A polyester containing no S-component is hereinafter called a "conventional polyester" and that containing S-component is hereinafter called "S-containing copolyester".

For a given polymerization degree the tenacity of a polyester fiber containing a large amount of S-component is lower than that of the polyester fiber not containing S-component, so that usage of such an S-containing copolyester fiber is limited.

Furthermore, the hydrolysis rate of the ester of the S-component with glycol is higher than that of the ester of an acid component of a conventional polyester with glycol. Hence, when alkali scouring an S-containing copolyester fiber, those ester linkages which are between the S-component units and the glycol in the polyester fiber are hydrolysed selectively. This results in defects, in a direction perpendicular to the fiber axis, which occur to an extent greater than when scouring a conventional polyester. Therefore, when alkali scouring an S-containing copolyester fiber and a conventional polyester fiber of the same weight, the ratio of the tenacity of the alkali scoured polyester fiber to the tenacity of the polyester fiber which is not alkali scoured is higher for the S-containing copolyester fiber than for the conventional polyester fiber.

Even before scouring, the tenacity of an S-containing copolyester fiber is lower than that of a conventional polyester fiber. On scouring, this effect is multiplied by the even greater reduction in tenacity caused by scouring the S-containing copolyester fiber as compared with that caused by scouring the conventional polyester fiber.

This means that, in practice, alkali scouring (which is usually carried out on conventional polyester fibers in order to provide a fabric having good hand) cannot be carried out on fibers of a copolyester containing a large amount of S-component.

Furthermore S-component is expensive, so that copolyester fibers containing a large amount of S-component are also expensive.

Because of these drawbacks usage of copolyester fibers containing a large amount of S-component is limited.

In order to overcome these drawbacks, the amount of S-component copolymerized should be decreased. However, on decreasing the amount of S-component, the dyeability of the copolyester fiber will become low.

In order to allow a reduction in the amount of S-component and yet still achieve acceptable dyeability, it is known to include an additional acid component and/or to include a high molecular weight glycol component (hereinafter called a "G-component") in addition to the low molecular weight glycol component of a conventional polyester.

Japanese laid-open patent publication No. 158325/1970, mentions that polyester fiber formed from a copolyester containing isophthalic acid in an amount of 10 mol % based on the acid component and S-component in an amount of 2.5 mol % based on the acid component has a dyeability equal to that of a copolyester fiber containing 4.5 mol % of S-component based on the acid component. However, as mentioned in Flory, "Macromolecular Chemistry", the melting point of a copolyester containing 10 mol % isophthalic acid and 2.5 mol % S-component based on the acid component is remarkably lower than that of a conventional polyester.

If the melting point of the polyester is lowered, the temperature at which false twisting is carried out has to be lowered and therefore the crimp rigidity of false twisted yarn will be reduced and the hand of the fabrics formed from this false twisted yarn will become impaired.

As an alternative to the above copolyester, Japanese laid open patent publication No. 26006/1971 mentions that a copolyester fiber containing as copolymer methoxy-polyethylene glycol having a molecular weight of 2000 in an amount of 2 weight % based on the weight of the copolyester and containing copolymerized S-component in an amount of 2.5 mol % based on the acid component has a dyeability equal to that of a copolyester fiber containing 4.5 mol % of S-component based on the acid component. By that method a copolyester fiber which is excellent in dyeability and in crimp rigidity is obtained, but it appears that a copolyester fiber having high tenacity was not obtained. In that Japanese publication, it is mentioned that intrinsic viscosity of the polyester disclosed must be lower than that of conventional polyesters so as to obtain the particular characteristics needed for the invention described therein. However if a polyester has such a low intrinsic viscosity it must also have a low polymerization degree and therefore low tenacity.

Now, as mentioned in Flory, "Macromolecular Chemistry", as the amount of a comonomer in a copolymer is increased, and as the molecular weight of the comonomer is increased, so the melting point of the copolymer is reduced. When attempting to reduce the amount of S-component as described above, if a comonomer having large molecular weight but having a particularly high ability to improve dyeability is used, the melting point of copolyester will be reduced only slightly while retaining sufficient dyeability. Therefore, it is advantageous to employ a G-component having a large molecular weight as described in Japanese laid-open patent publication No. 26006/1971 mentioned above rather than to employ an additional acid component which is not an S-component as in Japanese laid-open patent publication No. 158325/1970 also mentioned above. This is because the ability of the G-component to compensate for loss of dyeability caused by reduction in the amount of S-component is very much higher than that of an additional acid comonomer. In addition, for the same degree of polymerization, the melt viscosity of a polyester containing both S-component and G-component is lower than that of a polyester containing only the same weight of S-component this rendering it easier to spin. This is because the G-component has the ability to lower melt viscosity.

On the other hand, the dyed fabrics of a copolyester fiber formed from a copolyester containing a large amount of G-component are unsatisfactory in light resistance. This contrasts with the disadvantage of using large amounts of S-component which provides copolyesters having high melt viscosity and which after spinning and drawing in the usual manner to form a yarn, provides fibers of low tenacity. Hence, to date, it was believed that a copolyester fiber containing S-component and G-component, having high tenacity and at the same time being excellent in dyeability, in alkali resistance and in light resistance of the dyed fabrics formed from the copolyester fiber is not obtainable.

Furthermore, it has been disclosed in Japanese patent Laid-open publication No. 107512/1980, that it is useful for achieving good depth of color to manufacture a polyester by incorporating 0.5 to 10 weight percent of inert inorganic microfine particles such as silica sol having an average diameter of no more than 100 millimicrons in a polyethylene terephthalate polymer, to melt-spin the polyethylene terephthalate polymer, to draw the resulting tow to obtain a polyester fiber and to extract the surface layer of the fiber with an alkali solvent and thereby cause an uneven dissolution of the inert microfine particles so that an irregular configuration with delicate projections and recesses is developed over the entire surface of the fiber.

However, such a process does not lead to sufficient improvement of the brightness and depth of color, particularly because it uses disperse dyestuffs. Therefore, it is preferable to obtain a sufficient effect of the brightness and depth of color by applying the abovementioned process to a cationic dyeable polyester. However, since both the presence of S-component and the inert inorganic microfine particles make viscosity high, it would be very difficult to melt spin such a polyester and indeed a cationic dyeable fiber which has both adequate depth of color and adequate tenacity for practical use after alkaline scouring treatment has not previously been obtained.

SUMMARY OF THE INVENTION

It is, therefore, an object of this invention to provide an improved polyester fiber having excellent dyeability (particularly with basic dyes), high tenacity, excellent alkali resistance, and the false twisted yarns of which are excellent in crimp rigidity, and the dyed fabrics of which are excellent in depth of color, light resistance, alkali resistance and hand.

It is still another object of this invention to provide a method for the stable commercial-scale production of copolyester fiber spun therefrom having the above-mentioned characteristics.

As a result of intensive research into the amount of copolymerized S-component and G-component, the molecular weight of the glycol providing the G-component, the polymerization degree of the copolyester and the spinning conditions, we have found a copolyester fiber having all the above-mentioned characteristics at the same time.

This invention provides a polyester fiber having a tenacity of at least 4.0 g/d which comprises a copolyester having a degree of polymerization of from 80 to 100, the copolyester including an acid component and a glycol component, 1.0 to 2.0 mol percent of said acid component being metal sulfoisophthalic residues, and 0.5 to 1.9 weight percent of the copolyester being glycol residues provided by a glycol having a molecular weight of from 400 to 6000.

This invention also provides a method for producing a polyester fiber, which method includes spinning a copolyester having a polymerization degree of 82 to 105, the polyester including an acid component and a glycol component, 1.0 to 2.0 mol percent of the said acid component being metal sulfoisophthalic residues and 0.5 to 1.9 weight percent of the copolyester being glycol residues derived from a glycol having a molecular weight of 400 to 6000, which spinning is effected by a spinneret under the following conditions, Shear rate $(\dot{\gamma}) \leq 10^4$ sec$^{-1}$
Spinning draft ratio $\leq 250$
Back pressure of spinneret $\geq 40$ kg/cm$^2$
Shear stress $(\zeta) \leq (Q+0.7) \times 10^7$ dyne/cm$^2$ wherein Q is the mass output rate per single hole (g/min), and thereafter drawing the resultant fiber.

The polyester preferably comprises (a) a glycol component which is mainly residues of a low molecular weight glycol which is either ethylene glycol and/or 1,4 butanediol but which additionally includes the abovementioned high molecular weight glycol residues (which high molecular weight glycol residues are hereinafter called G-component) and (b) an acid component which is mainly residues of a dicarboxylic acid which is terephthalic acid or an ester-forming derivative thereof but which additionally includes the abovementioned metal sulfoisophthalic residues (which metal sulfoisophthalic residues are hereinafter called "S-component").

In addition to the abovementioned dicarboxylic acid and metal sulfoisophthalic residues, an additional small amount of the acid component (b) may be derived from at least one of the following compounds namely, isophthalic acid, naphthalene dicarboxylic acid, glutaric acid, adipic acid, azelaic acid, cebatic acid, 1,10-decane dicarboxylic acid, p-(2-hydroxyethoxy)benzoic acid, p-hydroxy benzoic acid and/or an ester-forming derivative of any of these. Also, in addition to the abovementioned low and high molecular weight glycol residues, an additional small amount of the glycol component (a) may be derived from at least one of the following compounds, namely diethylene glycol, triethylene glycol, propylene glycol, bisphenol A, tetraethylene glycol, neopentyl glycol, 1,4-cyclohexane-diol, 1,4-cyclohexane-dimethanol, trimethylol propane or pentaerythritol.

Delustering agents such as titanium dioxide, discoloration inhibitors, catalysts, alkali metal salts, oxidation inhibitors, flame retarders and various other substances may, if necessary, be added, for example, during a polycondensation reaction for preparing the copolyester.

Alkali metal salts are preferably used because they have the effect of restraining the formation of secondary products such as diethylene glycol, and oxidation inhibitors are preferably used because they have the effect of restraining oxidation decomposition of the polyester which may otherwise occur when copolymerizing the glycol providing the G-component.

In a copolyester in accordance with the present invention the S-component is preferably provided by at least one compound of the following general formula (I), hereinafter called an "S-compound".

(I)

wherein M is an alkali metal such as sodium, lithium or potassium and A and/or A' is hydrogen, an aliphatic hydrocarbon group, or —$(CH_2)_x$OH wherein x is an integer of not less than 2. Thus, of the 2, 4, 5 and 6 positions for the sulphonic acid radical, the 5-position (as shown) is preferred. As examples of S-compounds, there may be mentioned dimethyl-5-sodium sulfoisophthalate, bis-2-hydroxyethyl-(5-sodium sulfoisophthalate), bis-4-hydroxybutyl-(5-sodium sulfoisophthalate), dimethyl-5-lithium sulfoisophthalate. Among them, dimethyl-5-sodium isophthalate and bis-2-hydroxyethyl-(5-sodium sulfoisophthalate) are preferable. The S-compound represented by the general formula (I) should be present as comonomer in an amount of 1.0 to 2.0 mol % based on the total weight of acid compounds providing the acid component of the copolyester and more preferable amounts of S-compound are 1.3 to 1.8 mol % based on the total weight of acid compounds.

If the S-component in the copolyester is present in an amount of less than 1.0 mol % based on the total acid component, the dyeability of the polyester fiber formed from the copolyester is unsatisfactory, because of a lack of S-component in the polyester fiber capable of reacting with basic dyestuffs.

On the other hand, if the S-component is present in an amount of more than 2.0 mol% based on the total acid component, the melt viscosity of a polyester also having a sufficiently high polymerization degree for fiber formation (i.e. a polymerization degree of not less than 82), is too high, so that the tenacity of the resultant polyester fiber is too low.

In a copolyester in accordance with the present invention it is necessary that the glycol (hereinafter called the "G-compound") providing the G-component has a molecular weight of 400 to 6000, more preferably 400 to 4000. If the molecular weight of the G-compound is less than 400, the dyeability of the polyester fiber formed from the polyester is unsatisfactory. This is because the efficiency of such a G-compound in compensating for lack of dyeability of the unmodified polyester is low.

Further, since G-compounds having a molecular weight of less than 400 also have a low boiling point, the amount of distillate obtained when carrying out a polycondensation reaction is large and therefore the ratio of the amount of G-compound as modifier in the final polyester to its charged amount becomes low. In addition, it is difficult to control the content of G-component in the final polyester.

On the other hand, if the molecular weight of the G-compound is more than 6000, the dyeability of the polyester fiber formed from said polyester is unsatisfactory. This is because the efficiency of such a compound in compensating for the lack of dyeability of the unmodified polyester is low as a result of the affinity of this G-compound for copolyester being poor. In addition, oxidation resistance of such a polyester is unsatisfactory.

Hence, when using a G-compound having a molecular weight of less than 400 or more than 6000 as comonomer, a large amount of G-compound must be copolymerized to provide a polyester fiber having excellent dyeability. Therefore, the light resistance of the dyed fabrics of the polyester fiber is lower.

In a copolymer in accordance with the present invention, the G-component is derived from a compound having a molecular weight of from 400 to 6000 which preferably has the following general formula (II)

(II)

wherein R is a divalent aliphatic hydrocarbon group having 3 to 20 carbon atoms such as —$(CH_2)_4$—, or is a divalent aromatic hydrocarbon group having 6 to 20 carbon atoms such as m' and n' are the same or different integers of 1 to 100, or wherein (III)

n is an integer of from 2 to 5, m is an integer of from 3 to 100, and A is a hydroxy group, or a group of the formula (IV)

wherein l is an integer of from 1 to 10. Among these, polyalkylene glycols represented by the formula (III) are preferable. This is because the function of decreasing the melt viscosity of the resultant copolyester is particularly excellent for such compounds as compared with the compounds of formula (II).

In addition, among the polyalkylene glycols, a polyethylene glycol of which both end groups are each a hydroxy group are most preferable. For compounds of the formula (III), n is smaller and the G-compounds is therefore more randomly copolymerized. Similarly G-compounds of which both of their end groups are hydroxy group are more randomly copolymerized than other G-compounds and the more randomly copolymerized are the G-compounds, the more efficient are they in providing excellent dyeability and the more excellent is their function of decreasing melt viscosity of the copolyester.

The G-compound should be present as comonomer in an amount of from 0.5 to 1.9 weight % based on the copolyester obtained, more preferable amounts of G-compound being from 0.7 to 1.5 weight % based on the copolyester obtained.

If the G-compound is present in an amount of less than 0.5 weight % based on the copolyester obtained, the dyeability of the copolyester fiber formed from the copolyester is unsatisfactory.

On the other hand, if the G-compound is present in an amount of more than 1.9 weight % based on the copolyester obtained, the dyed fabrics formed from copolyester have a remarkably bad light resistance and are not suitable for practical use. In addition, oxidation resistance of the copolyester is unsatisfactory.

In a fiber in accordance with the present invention, it is necessary that the polymerization degree of the copolyester fiber should be from 80 to 100, more preferably from 85 to 100.

If the polymerization degree of the copolyester fiber is less than 80, the tenacity of the copolyester fiber becomes less than 4.0 g/d.

On the other hand, if the polymerization degree of the copolyester fiber is more than 100, the melt viscosity of the copolyester from which the copolyester fiber is obtained is too high so that melt spinning cannot be carried out in the usual manner and the tenacity of the copolyester fiber obtained is less than 4.0 g/d.

It is known to impart softness to a woven or knitted fabric of polyester fiber by treating it with alkali to hydrolyze its surface layer. However, since the tenacity of fibers decreases so much during the alkaline scouring, it is necessary for the polyester fiber to have a tenacity of at least 4.0 g/d wherein the residual elongation is preferably within the range of 35% to 40%. The reason why the tenacity of a fiber after scouring is reduced is because of the many defects produced in the fiber by scouring; a fiber does not uniformly dissolve from its surface by hydrolysis, but dissolution will start from the weakest point where the fiber structure is rather bulky. The higher the tenacity before alkali scouring, the higher the tenacity after alkali scouring. In order to obtain a fabric suitable for practical use, fibers taken from a fabric which has been subjected to controlled hydrolysis (to minimize the loss in weight to around 20%) should have a final tenacity of at least 3.0 g/d. That result should be obtained by using a drawn yarn which has a tenacity of no less than 4.0 g/d prior to hydrolysis.

Figure 1:
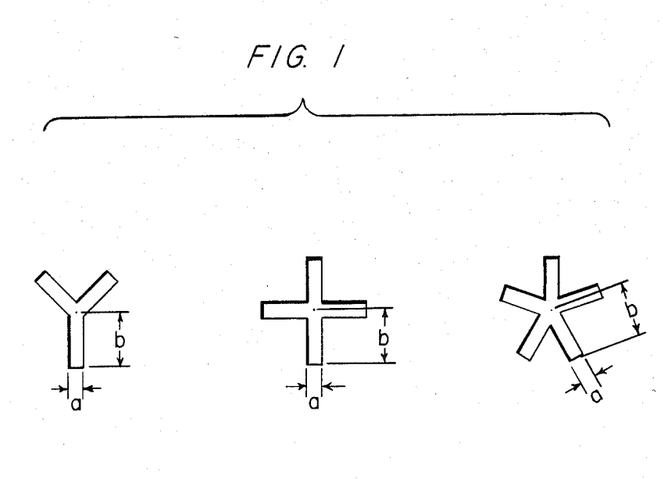

A polyester fiber embodying the present invention is suitable for providing silky fabric and preferably has a trilobular, quadribolular or pentalobular cross-section as shown in FIG. 1. Generally it is well known that such a cross section can give a particularly desirable silk-like lustrous effect to the fiber. However, in a conventional polyester fiber, providing a tri-, tetra- or pentalobule cross section so as to give such luster fails to give a sufficient brightness and depth of color on dyeing because of the higher reflection from the fiber surface which occurs with such cross-sections. In particular, for a conventional polyester which can be dyed only with disperse dyestuffs the depth of color stays at a very low level, though it has become clear that if a cationic dyestuff (which has a high molecular extinction coefficient value) is used improved results can be obtained.

For silky fabric produced from polyester fibers it is particularly desirable to scour the fabric with alkali to obtain the silky hand. We find that such a silky fabric having widespread practical use can be obtained only from cationic dyeable polyester fibers embodying the present invention.

If the filament denier becomes less than 1.3 denier, fabrics formed from conventional polyesters which can be dyed only by disperse dyestuff are insufficient in brightness and depth of color, this being because of their high surface area per unit volume of component filament. However, a copolyester embodying the present invention is preferably spun into a fine denier filament that is no more than 1.3 denier for producing soft hand fabrics which are easily dyeable with cationic dyes and provide the possibility of alkali scouring.

It will be more effective for achieving a good depth of color to apply a process which makes the fiber surface rough for scattering the incident light to the surface of it.

As has previously been mentioned Japanese laid-open patent publication No. 107512/1980 describes a method for increasing depth of color by extracting the surface layer of a fiber formed from a polyethylene terephthalate polymer in which micro-fine particles are incorporated with an alkali solvent so as to cause an uneven dissolution of the inert microfine particles so that an irregular configuration with delicate projections and recesses is developed over the entire surface of the fiber. However, as is also mentioned above such a process does not lead to a sufficient improvement in the brightness and depth of color when dyeing with disperse dyestuffs, with which conventional polyesters fiber are dyed.

In contrast, in a method embodying the invention for providing a polyester fiber the following parameters are maintained within respective ranges of values to produce an excellent fiber having widespread practical use, namely the amount of S- and G-components in the copolyester, the molecular weight of the G-compound of the copolyester, the degree of polymerization of the polyester fiber the average diameter of the inert inorganic microfine particles incorporated in the copolyester and the amount of such particles incorporated in the polyester. In addition, particular spinning conditions are chosen as later described.

Even though the copolymer contains S-component and inorganic microfine particles, it still has a melt viscosity which is sufficiently low to achieve efficient spinning. The process results in a fiber having adequate tenacity for practical use and gives fibers from which fabrics having excellent brightness and depth of color can be manufactured.

The abovementioned ranges of the amounts of S- and G-components, the molecular weight of the G-compound and the degree of polymerization have been previously given.

In this process embodying the present invention, the inert inorganic microfine particles which may be used are for example, silica sol, silica powder, fine particle alumina, alumina sol, microfine titanium dioxide, fine particle calcium carbonate and "alkyl coated silica".

"Alkyl coated silica" is a microfine particle silica having silanol groups on the surface, which silanol groups are reacted with compounds having an alkyl silyl group such as dimethyl dichlorosilane or diethyl dichlorosilane. Because they give a particularly great increase in the depth of color of the dyed fabrics obtainable from the copolyester fiber, and because they are easily and efficiently dispersible in the copolyester obtained, silica sol and "alkyl coated silica" are preferred; furthermore "alkyl coated silica" is most preferred.

The percentage of silanol groups on the surface which are reacted with compounds having alkyl silyl groups is preferably not less than 30.

The average diameter of the inert inorganic microfine particles is preferably not more than 100 m$\mu$, more preferably not more than 40 m$\mu$ and most preferably not more than 20 m$\mu$. If the average diameter is kept within the above limits, alkali scouring of the copolyester fiber formed from the copolyester gives a specific surface having a large number of recesses parallel to the fiber axis. However, if the average diameter is more than 100 m$\mu$, alkali scouring does not give a surface having a sufficiently large number of such recesses in it and therefore the depth of color of the dyed fabrics formed from the copolyester fiber is unsatisfactory.

The amount of the inert inorganic microfine particles is preferably from 0.1 to 4 weight %, more preferably from 0.3 to 1.5 weight %, based on the copolyester fiber obtained.

If the amount of the inert inorganic microfine particles added is less than 0.1 weight % based on the copolyester fiber obtained, the depth of color of the dyed fabrics formed from the copolyester fiber obtained is unsatisfactory. On the other hand, if the amount of the inert organic microfine particles added is more than 4 weight % based on the copolyester fiber obtained, the melt viscosity of the copolyester including the inert inorganic microfine particles and having a polymerization degree of not less than 82 is too high because of the increase in melt viscosity caused by the inert inorganic microfine particles, so that the tenacity of the copolyester fiber obtained is low.

In the method of the present invention, the size of recesses parallel to the fiber axis which are formed is not limited, but it is preferable that the width (i.e. maximum extent in a direction perpendicular to the fiber axis) of the recesses is from 0.05 to 1.5$\mu$ and the ratio of length (i.e. maximum extent in a direction parallel to the fiber axis) and width is not less than 1.5 in order to achieve the desired depth of color of the dyed fabrics formed from the polyester fiber.

A method embodying the present invention for providing improved polyester fiber is described in more detail below.

The improved polyester fiber is obtained by spinning a copolyester, the polymerization degree being 82 to 105, the copolyester including an acid component, 1.0 to 2.0 mol percent of the acid component being metal sulfoisophthalic residues and 0.5 to 1.9 weight percent of the copolyester being glycol residues derived from a glycol having a molecular weight of 400 to 6000, the spinning being carried out under the following conditions and thereafter drawn:

Shear rate $(\dot{\gamma}) \leq 10^\alpha \sec^{-1}$
Spinning draft ratio $\leq 250$
Back pressure of spinneret $(P) \geq 40$ kg/cm$^2$
Shear stress $(\tau) \geq (Q+0.7) \times 10^7$ dyne/cm$^2$ wherein Q is the mass output rate per single hole (g/min hole). The shear rate and shear stress are calculated in accordance with the following equations:

$$\text{Shear rate } (\dot{\gamma}) = \frac{32 \times \theta'}{\pi D^3 \times \rho} \text{ (sec}^{-1})$$

wherein Q' is the mass output rate per single hole (g/sec. hole), D is the hole diameter of the spinneret (cm) and $\rho$ is the density of the melted polyester (g/cm$^3$).

$$\text{Shear stress } (\tau) = \frac{9.8 \times 10^5 \times P \times D}{4L} \text{ (dyne/cm}^2)$$

wherein D is as defined above, L is the hole depth of spinneret (cm) and P is the back pressure of the spinneret (kg/cm$^2$).

The copolyester from which a copolyester fiber in accordance with this invention is formed can be obtained by using any of the usual processes for producing polyesters, for example, a process comprising an ester-exchange reaction of terephthalic acid dimethyl ester and S-compound with ethylene glycol and G-compound, followed by a condensation reaction, a process comprising an esterificaton reaction of terephthalic acid, S-compound, ethylene glycol and G-compound, followed by a polycondensation reaction.

It is preferable that the S-compound is added during the period before the polycondensation is well under way. In addition, when the S-compound is a glycol ester, it is preferable that the S-compound is added during a period from before the completion of the ester-exchange reaction or esterification reaction to the beginning of the polycondensation reaction.

The addition of G-compound during the time from immediately before the completion of the ester-exchange reaction or esterification reaction to the beginning of the polycondensation reaction is particularly preferable in that the decomposition of the ether linkage is thereby suppressed.

The copolyester from which the copolyester fiber having a polymerization degree of 80 to 100 is formed may be obtained by using a melt-polycondensation reaction process or a melt-polycondensation reaction and solid-polycondensation reaction.

In order to obtain a copolyester fiber in accordance with the present invention, it is necessary that the polymerization degree of the copolyester from which the fiber is formed is from 82 to 105, because this allows for a decrease in the polymerization degree during the melt spinning.

Since the melt viscosity of a copolyester embodying the present invention is from 1.8 to 3.0 times as high as that of a conventional polyester for textiles, a tough fiber having a tenacity of no less than 4.0 g/d can be obtained only by applying the specific spinning conditions described above. It is necessary to keep the following spinning conditions within specific ranges of values, namely shear rate, shear stress, back pressure of spinneret and spinning draft ratio. When shear rate or shear stress becomes greater than the upper limit as mentioned before, flow of the molten polyester cannot be kept uniform and the tenacity of the fiber then falls.

The back pressure (P) must be no less than 40 kg/cm². When the back pressure (P) becomes less than 40 kg/cm², there may be a considerable fluctuation in the mass output rate for an individual spinneret. Thus it is preferable for the pressure (P) to be no less than 50 kg/cm², and more preferable for it to be no less than 60 kg/cm².

The spinning draft ratio must be no more than 250. When the spinning draft ratio becomes more than 250, evenness of yarn denier may be lost due to uneven deformation during cooling of the yarn. Such unevenness causes a reduction in the yarn tenacity and the yarn also shows dye unevenness.

As previously mentioned, the fiber embodying the present invention having tri-, quadri- or penta-lobular cross section has a desirable silk-like luster and excellent brightness and depth of color.

To produce such a fiber from the copolyester of the present invention, it is preferable to control shear stress ($\tau$) within the range of no more than $(0.43Q+0.64) \times 10^7$ dyne/cm², wherein shear rate ($\dot{\gamma}$) is as defined above.

For the calculation of shear rate ($\dot{\gamma}$) and shear stress ($\tau$) for any of a tri- or pentalobule cross section, the following equations can be used.

$$\dot{\gamma} = \frac{6\theta'}{n.a^2 b \rho} \ (\text{sec}^{-1})$$

$$\tau = \frac{9.8 \times 10^5 a \rho}{2L} \ (\text{dyne/cm}^2)$$

Wherein Q', ρ, L, P are as defined above, a and b are as shown in the accompanying drawing, a being the width of the slits of the spinneret, b being the length of the slits of the spinneret, and n is 3, 4 or 5, for a trilobule, quadrilobule or pentalobule, respectively.

A cationic dyeable polyester fiber having a large number of microfine recesses parallel to the fiber axis on the fiber surface may be produced by melt-spinning the improved polyester containing S-component, G-component and inert inorganic microfine particles of which the average diameter in the mono-particulate form is no more than 100 mμ and having a polymerization degree of 82 to 105, under the spinning conditions described above, drawing the spun polyester and alkaline scouring the drawn polyester to a weight loss of 5 to 40 weight percent.

A copolyester used in forming a fiber in accordance with this invention, may be produced for example, by transesterifying dimethyl terephthalate and 5-sodium sulfoisophthalate with ethylene glycol, adding inert inorganic microfine particles to the reaction mixture and polymerizing the reaction mixture.

The addition of inert inorganic microfine particles, which are dispersed in aliphatic glycols, aliphatic alcohols or water by conventional methods, to the reaction mixture can be carried out at any time before completion of the subsequent polycondensation, for example, during esterification transesterification or polycondensation. It is undesirable to add the inert inorganic microfine particles after completion of polycondensation, because the particles then aggregate.

The slurry of inert inorganic microfine particles can be prepared by conventional methods, preferably the method described in the specification of Japanese Laid Open Patent Publication No. 125495/1978, namely to disperse the particles by a high-speed agitator, or by a method which additionally uses an ultrasonic disperser. It is desirable to filter the prepared slurry with a filter, finer than 60 mesh for removing coarse particles. It is also desirable to add some dispersant to the slurry of inert inorganic microfine particles to prevent aggregation of the particles in the slurry. Tetraalkyl ammonium hydroxides are especially useful for this purpose. As such tetraalkyl ammonium hydroxides, there may be used, for example, tetramethyl ammonium hydroxide, tetraethyl ammonium hydroxide, tetrapropyl ammonium hydroxide, tetraisopropyl ammonium hydroxide, tetrabutyl ammonium hydroxide, and of these compounds tetraethyl ammonium hydroxide is most preferable. Tetraalkyl ammonium hydroxides are added preferably in an amount of from 2 to 30 weight percent, more preferably 5 to 20 weight percent, based on the weight of the inert inorganic microfine particles.

Polyester fibers, melt spun from the polyester polymer mentioned above in the specified spinning conditions and drawn, may be provided on the fiber surface with a large number of microfine recesses parallel to the fiber axis by alkaline scouring the polyester fiber to a weight loss of 5 to 40 weight percent. When the alkaline scouring ratio is less than 5 weight percent, a desirable fiber surface is not obtained and the polyester fiber does not then have an adequate depth of color. On the other hand, when the alkaline scouring ratio exceeds 40 weight percent, the tenacity of the treated fiber goes down beyond the limit of practical use.

The alkaline scouring of the polyester fibers or fabrics can be carried out by a treatment in alkaline aqueous solution or by pad-steaming. As alkaline compounds, there may be used basic alkali metal compounds, for example, caustic soda, caustic potash, sodium oxide, potassium oxide and sodium carbonate. Suitably, accelerators for alkaline scouring are used, for example, cetyl trimethyl ammonium bromide or lauryl dimethyl benzyl ammonium chloride.

It is preferable for adequate depths of color for the amount of alkali used to be beyond 1.1 times as much as that theoretically needed.

The improved polyesters are dyeable with cationic dyestuffs at a temperature of 110° to 140° C. preferably 120° to 135° C. the temperature being adjustable in dependence upon the polymer composition.

It is preferable for adequate depths of color of the dyed fabrics to adjust the composition of the improved polyester and the dyeing conditions so that the degree of Malachite Green exhaustion is not less than 55%.

The advantages and excellent effects achievable with a copolymer fiber embodying this invention are as follows:

(1) Since the improved cationic dyeable polyester fibers have a high tenacity (not less than 4.0 g/d), the fabrics produced from the polyester fiber have good tear strength even after alkaline scouring up to at least 20 and sometimes up to 40 weight percent loss, they are able to be employed in the manufacture of articles of clothing for which conventional cationic dyeable polyesters could not be used because of the lowering of tear strength of the fabrics which occur with such fabrics on alkaline scouring.

(2) Since the polyester fibers are made of a copolyester having (a) an acid component which contains from 1.0 to 2.0 mol percent of S-component which is dyeable by cationic dyestuffs, and (b) 0.5 to 1.9 percent by weight of the copolyester of a G-component which raises the susceptibility of the S-component to dyeing with cationic dyestuffs, they have excellent dyeability with cationic dyestuffs.

(3) Since the intensity of scattered light in the fiber is lowered by good uniformity of dyeing due to the copolymerization of S-component (1.0 to 2.0 mol percent of the acid component) and G-component (0.5 to 1.9 weight percent of the copolyester) the dyed fabrics have adequate depths of color.

(4) Since the polyester fabrics can be dyed by cationic dyestuffs which have a higher molar absorption coefficient than disperse dyestuffs, the dyed polyester fabrics have adequate depths of color. Since many cationic dyestuffs are superior in brightness, the fabrics dyed by such cationic dyestuffs have good brightness.

(5) Since the content of G-component (which tends to lower the light stability of dyed fabrics when present in large quantities) is not more than 1.9 weight percent, the light stability of the dyed fabrics is adequate.

(6) Since both the G-component of high molecular weight and the S-component are copolymerised in small quantity, the melting points of the polyesters obtained go down only slightly. This enables the polyester fibers obtained to be false-twisted at high temperature and the false-twisted yarns thus produced have a high crimp rigidity and the fabrics produced from the false-twisted yarn are good to the touch.

(7) When the sections of the polyester fiber are trilobule, quadrilobule, or pentalobule, the dyed fabrics have a good brightness which could not be achieved for conventional polyester fabrics.

(8) Even if the size of a single filament of polyester fiber of which a fabric is composed is not more than 1.3 denier, the dyed fabrics made from the polyester fibers have adequate depths of color.

(9) By addition of a specified amount of inert inorganic microfine particles having a critical diameter and alkaline scouring of the fabrics made from this polyester, the microfine recesses parallel to the fiber axis are realized and this enables the fabrics to have adequate depths of color after dyeing.

The effects of processes embodying the invention for producing polyester fibers are as follows.

(10) Since the spinning conditions of the highly viscous polyester described above are specified by the behavior of melt flow and melt deformation at the spinneret, it has become possible to produce the improved polyester fibers which have sufficient tenacity and good processability in spinning and texturing.

(11) Since the spinning conditions for trilobule, quadrilobule and pentalobule fiber are even more specified by the behavior of melt flow and melt deformation at the special spinneret employed for spinning such fibers, it has been possible to produce the improved polyester fibers of trilobule to pentalobule cross section, which have sufficient tenacity and good processability in spinning and texturing.

(12) Since the polyester fibers containing inert organic microfine particles of specified diameter and content can be alkaline scoured to a weight loss of 5 to 40 weight percent, it has been possible to obtain the improved polyester fiber having microfine recesses parallel to the fiber axis.

TESTING METHOD FOR TENSILE STRENGTH OF YARNS

This testing is performed on straight multifilament yarns which were conditioned at 65% relative humidity and 20° C. for 24 hours prior to testing. A "Tensilon" (Registered Trademark) Tensile Testing Machine, which is adapted for the measurement of constant rate of specimen extension, is used. The test sample is 200 millimeters long; substantially no twist is added; the cross-head speed is 200 millimeters/minute; the rate of attenuation is 100%/minute; and the chart speed is 200 millimeters/minute, the tenacity is the maximum load in grams before the yarn breaks divided by the denier of the yarn.

DESCRIPTION OF THE PREFERRED EMBODIMENTS

Copolyester fibres embodying this invention and processes for producing them are now illustrated in more detail with reference to the following Examples, which include polyester fibres outside the present invention for the purpose of comparison. In the Examples, the characteristic values were measured as follows:

Content of G-component

The polymer sample is decomposed by monoethanol amine, and the G-component is then quantified by gas chromatography or titration with sodium tetraphenyl borate.

Polymerization Degree

The polymerization degree is calculated using the following equation.

Ne = Number of end groups per $10^6$ g polymer

Wa = Average molecular weight of each repeating unit in the polymer.

$$\text{Polymerization Degree} = \frac{2 \times 10^6}{Ne \times Wa}$$

On the assumption that the end groups consist of hydroxy and carboxy groups, only the end groups were analyzed.

Hydroxy group is quantified by titration with bromoacetyl bromide and carboxy group is quantified according to the method of Pohl (Anal. Chem. 26 1614(54)).

Intrinsic Viscosity

This is measured in a solution of o-chlorophenol at 25° C.

Melting Point

This is measured by DSC (Perkin-Elmer DSC-1B), sample weight being 10 mg mg in an atmosphere of $N_2$, the temperature being elevated from room temperature at a speed of 16° C./min.

Oxidation Resistance

This is measured by TG-DTA (Rigaku Denki Co. Ltd., "Thermoflex"). The temperature of a sample of 10 mg in weight, reduced to powder of 80 to 120 mesh, is elevated from room temperature at a speed of 10° C./min.

Average Diameter of Particles in Monoparticulate Form

This is calculated from the average of the largest diameter of the inert inorganic microfine particles viewed under a transmission type electron microscope at one hundred thousand magnifications.

Preparation of Circular Knitted Fabric

A circular knitted fabric is prepared using a hosiery knitting machine of 2.7 gauge using the evaluated polyester fiber.

Scouring

A circular knitted fabric is scoured for 5 minutes by boiling water containing 0.2% of the nonionic surfactant "Sandet" G-900 (Sanyo Chemical Ind. Ltd) and 0.2% soda ash, washed by water and dried.

Light Resistance

A circular fabric knitted from the evaluated filament is scoured, dyed and given a reduction cleaning under the following conditions. The fabric prepared is irradiated in a fade meter according to the method of JIS.L1044 and the light resistance is expressed as a fastness on a Blue Scale Standard.

Conditions of Dyeing and Reduction Cleaning

Dyeing

Dyestuff: Estrol Blue N-3RL (Sumitomo Chemical Co. Ltd); 1.5% on weight of fabric (o.w.f.)

pH regulator: acetic acid 0.5 ml/l; sodium acetate 0.15 g/l.

Bath ratio: 1:100
Bath temperature: 120° C.
Dyeing Time: 60 min
Reduction Cleaning
Hydrosulfite: 2 g/l
Caustic Soda: 2 g/l
Nonionic surfactant: Sandet G-900, 2 g/l
Bath Temperature: 80° C.
Treating time: 20 min

Dyeability—Degree of Dye Exhaustion

A circular fabric knitted from the evaluated filament is dyed after reduction cleaning under the following conditions. The light absorbance of each of the dyeing liquids before and after dyeing is measured and the degree of dye exhaustion is calculated from the following formula Degree of dye exhaustion $(\%) = 100(X - Y)/x$ wherein $X$ = the light absorbance before dyeing, and $Y$ = the light absorbance after dyeing.

Conditions of Dyeing

Dyestuff: Malachite Green, Oxalate (Kanto Chemical Co. Ltd)

5% o.w.f.

pH regulator: acetic acid 0.5 ml/l; sodium acetate 0.2 g/l.

Bath ratio: 1:200
Bath Temperature: 120° C.
Dyeing time: 60 min

Alkali Resistance

The polyester fiber evaluated is subjected to alkali treatment in a solution containing 50 g/l caustic soda at a bath temperature of 95° C. and at a bath ratio of 1:100, and then when the weight loss of the fiber reaches 20%, the tenacity of the fiber is measured.

Alkaline Scouring

A circular knitted fabric is immersed in a bath at a bath ratio of 1:50 in boiling water containing 3 weight % caustic soda, treated with stirring for a certain period, washed with water, neutralized with a 1 weight percent aqueous solution of acetic acid, washed with water again and then dried.

Depth of Color

A circular fabric knitted from the evaluated filament, alkaline scoured as occasion demands, is set in a relaxed condition at 180° C. for 30 seconds, and dyed with Cathilon Black CD-BLH (Sumitomo Chemical Co. Ltd.) or Dianix Black FB-FS (Mitsubishi Chemical Ind. Ltd). of 14% o.w.f., with the addition of 0.5 g/l acetic acid and 0.15 g/l sodium acetate, at a bath ratio of 1:50 and a bath temperature of 130° C. for 60 minutes, washed with water and then dried.

The depth of color of each dyed fabric is estimated from the reflectance (represented as L value, which is larger for deeper colors) of the fabric measured by "Color ΔE Computer CDE-Ch-1" (Suga Test Instruments Co. Ltd.).

Observation of Fiber Surface

This is carried out using a field emission scanning electron microscope S-700 (Hitachi, Ltd) at five thousand magnifications.

EXAMPLE 1 (PREFERRED EMBODIMENT)

150 kg of dimethyl terephthalate, 94 kg of ethylene glycol and 4 kg of 5-sodium sulfoisophthalic acid dimethyl ester (hereinafter called "AD") were placed in an ester-exchange reactor. To this mixture, 210 g of LiOAc.2H$_2$O, 30 g of Mn(OAc)$_2$.4H$_2$O and 60 g of Sb$_2$O$_3$ were added. The ester-exchange reaction was carried out by elevating the temperature from 140° C. to 235° C. in 4 hours at atmospheric pressure with stirring, while distilling away the by-produced methanol. To this reaction system, 64.5 g of trimethyl phosphate, 810 g of a 16% by weight TiO$_2$ dispersion in ethylene glycol, 150 g of "Irganox 1010" (Ciba-Geigy Co. Ltd.), which has the function of providing oxidation resistance, were added. The pressure of the reaction system was gradually reduced to 500 mmHg, and 25 kg of ethylene glycol were distilled. The resulting product was transferred into a polycondensation tank at 240° C. A glycol compound of the type and in the amount given in Table 1 was then added, the inside temperature was elevated from 240° C. to 280° C. in 2 hours and the pressure of the reaction system was gradually reduced to 1 mmHg in an hour. Thereafter, the polycondensation reaction was conducted for 2 hours at 280° C. and not more than 1 mmHg to obtain a copolyester having the characteristics shown in Table 1.

TABLE 1

| No. | added glycol compound Type | molecular weight | quantity of added glycol (weight % based on co-polyester) | Intrinsic viscosity | Melting point (°C.) | quantity of co-polymerized glycol (weight % based on co-polyester) | oxidation resistance (°C.) |
| --- | --- | --- | --- | --- | --- | --- | --- |
| 1. | polyethylene glycol | 400 | 1.0 | 0.57 | 252 | 1.0 | 235 |
| 2. | " | 600 | " | 0.58 | 253 | " | 230 |
| 3. | " | 1000 | " | 0.59 | 253 | " | 226 |
| 4. | " | 2000 | " | 0.58 | 254 | " | 220 |
| 5. | " | 4000 | " | 0.59 | 254 | " | 212 |
| 6. | " | 6000 | " | 0.59 | 254 | " | 210 |
| 7. | polytetramethylene glycol | 2000 | " | 0.58 | 253 | " | 216 |
| 8. | tetraethylene glycol | 194 | " | 0.59 | 250 | 0.8 | 245 |
| 9. | " | 194 | 1.2 | 0.58 | 250 | 1.0 | 242 |
| 10. | polyethylene glycol | 300 | 1.0 | 0.59 | 252 | 0.9 | 238 |
| 11. | " | 8000 | 1.0 | 0.58 | 254 | 1.0 | 199 |
| 12. | " | 1000 | 2.0 | 0.59 | 253 | 2.0 | 207 |
| 13. | " | " | 4.0 | 0.60 | 253 | 4.0 | 192 |
| 14. | " | " | 0.4 | 0.57 | 255 | 0.4 | 250 |

This copolyester was then dried and was spun under the conditions shown in Table 2. In addition the spinning draft ratio was 100, the shear rate was 5800 sec$^{-1}$, the back pressure of spinneret was in the range of from 65 to 85 Kg/cm$^2$ and the shear stress was in the range of from $1.0 \times 10^7$ to $1.3 \times 10^7$ dyne/cm$^2$.

TABLE 2

| | |
| --- | --- |
| Hole shape of spinneret | round |
| Hole diameter of spinneret | 0.27 mm |
| Hole depth of spinneret | 0.44 mm |
| Mass output rate per single hole | 0.79 g/min. hole |
| Spinning temperature | 300° C. |
| Spinning velocity | 1100 m/min |

The undrawn yarn thus obtained was then drawn in the usual way to obtain drawn fibers of 75 denier/36 filaments. The characteristics of the fibers, i.e. tenacity, elongation, polymerization degree, dyeability, light resistance and alkali resistance were measured and are shown in Table 3.

TABLE 3

| No. | Tenacity (g/d) | Elongation (%) | Polymerization degree | Dyeability (%) | Light resistance (grade) | Alkali resistance (g/d) |
| --- | --- | --- | --- | --- | --- | --- |
| 1 | 4.4 | 35 | 87 | 56 | 4.0 | 3.5 |
| 2 | 4.4 | 36 | 87 | 58 | 4.0 | 3.5 |
| 3 | 4.4 | 33 | 88 | 58 | 4.0 | 3.5 |
| 4 | 4.3 | 38 | 86 | 58 | 4.0 | 3.4 |
| 5 | 4.4 | 35 | 88 | 60 | 4.0 | 3.5 |
| 6 | 4.4 | 34 | 87 | 59 | 4.0 | 3.5 |
| 7 | 4.5 | 31 | 88 | 56 | 4.0 | 3.5 |
| 8 | 4.4 | 34 | 87 | 35 | 4.0 | 3.5 |
| 9 | 4.4 | 35 | 87 | 40 | 4.0 | 3.5 |
| 10 | 4.5 | 34 | 88 | 46 | 4.0 | 3.5 |
| 11 | 4.3 | 36 | 86 | 49 | 4.0 | 3.4 |
| 12 | 4.3 | 37 | 86 | 60 | 3.0 | 3.4 |
| 13 | 4.3 | 34 | 87 | 65 | 2.0 | 3.4 |
| 14 | 4.4 | 33 | 87 | 40 | 4.0 | 3.5 |

In Tables 1 and 3 the copolyester fibers manufactured according to the present invention are those of experiment Nos. 1 to 7, which have a polymerization degree of not less than 80, a tenacity of not less than 4.0 g/d, and are excellent in dyeability, light resistance and alkali resistance.

On the other hand, when the molecular weight of added glycol compound was lower than 400 (experiment Nos. 8, 9 and 10) the dyeability was low, and the quantity of copolymerized glycol component was less than the quantity of added glycol compound.

Further, when the molecular weight of added glycol component was greater than 6000, the oxidation resistance of the copolyester obtained was poor and the dyeability was low (experiment No. 11).

Further, when the quantity of copolymerized glycol experiment was not less than 2.0 weight percent based on the copolyester obtained, (experiment Nos. 12 and 13), the oxidation resistance of the copolyester obtained was unsatisfactory, and the light resistance was unsatisfactory.

Further, when the quantity of copolymerized glycol component was 0.4 weight percent based on the copolyester obtained, the dyeability was low (experiment No. 14).

EXAMPLE 2

A copolyester fiber was obtained in the same way as that described in Example 1 except that the AD was present in the amounts shown in Table 4, the added glycol compound was polyethylene glycol having a molecular weight of 600, and the quantity of the added glycol compound was 1.0 weight percent based on the copolyester obtained. The characteristics of the copolyester thus obtained, the spinning conditions and the characteristics of the copolyester fiber thus obtained, namely polymerization degree, tenacity, elongation, dyeability, light resistance and alkali resistance are shown in Table 4.

TABLE 4

| | Quantity of co-polymerized AD based on acid component (mol %) | characteristics of the copolyester | | spinning conditions | |
| --- | --- | --- | --- | --- | --- |
| No. | | intrinsic viscosity | melting point (°C.) | back pressure of spinneret (Kg/cm$^2$) | shear stress (dyne/cm$^2$) |
| 15 | 0.5 | 0.62 | 255 | 50 | 0.71 × 10$^7$ |
| 16 | 1.0 | 0.60 | 254 | 61 | 0.85 |
| 17 | 1.5 | 0.58 | 253 | 70 | 1.00 |

TABLE 4-continued

| | | | | | |
|---|---|---|---|---|---|
| 18 | 2.0 | 0.56 | 252 | 85 | 1.21 |
| 19 | 2.5 | 0.52 | 252 | 101 | 1.45 |
| 20 | 2.5 | 0.56 | 252 | 113 | 1.62 |

| | characteristics of the copolyester fiber | | | | |
|---|---|---|---|---|---|
| No. | polymerization degree | tenacity (g/d) | elongation (%) | dyeability (%) | light resistance (grade) | alkali resistance (g/d) |
| 15 | 97 | 4.8 | 35 | 35 | 4.0 | 4.1 |
| 16 | 94 | 4.6 | 35 | 53 | 4.0 | 3.8 |
| 17 | 90 | 4.3 | 38 | 58 | 4.0 | 3.4 |
| 18 | 85 | 4.1 | 35 | 63 | 4.0 | 3.1 |
| 19 | 78 | 3.7 | 31 | 68 | 4.0 | 2.8 |
| 20 | 85 | 3.7 | 33 | 65 | 4.0 | 2.8 |

Remarks:
(1) Shear rate was 5800 sec$^{-1}$, spinning draft ratio was 100 in Example 2.
(2) The copolyester of experiment No. 20 was obtained by polycondensing the copolyester of experiment No. 19 in solid state for 2 hours at 190° C. under vacuum.

In Table 4 the copolyester fibers manufactured according to the present invention are those of experiment Nos. 16, 17 and 18, which have a polymerization degree of not less than 80, a tenacity of not less than 4.0 g/d, and are excellent in dyeability, light resistance and alkali resistance.

On the other hand, when the quantity of copolymerized AD was 0.5 mol % based on acid component, the dyeability was low (experiment No. 15). Further, when the polymerization degree of the copolyester fiber was 78, its tenacity was 3.7 g/d (i.e. less than 4.0 g/d) and its alkali resistance was unsatisfactory (experiment No. 19). Further, when the quantity of copolymerized AD was 2.5 mol % based on acid component and the polymerization degree of the copolyester fiber was 85 (experiment No. 20), the shear stress was unacceptably high and therefore the tenacity was only 3.7 g/d (less than 4.0 g/d) and alkali resistance was unsatisfactory.

EXAMPLE 3

A copolyester fiber was obtained in the same way as that described in Example 1 except that the quantity of copolymerized AD was 1.7 mol % based on acid component, the added glycol compound was polyethylene glycol having a molecular weight of 600, the quantity of added glycol compound was 1.0 weight % based on the copolyester, and polymerization degree was changed so as to be as shown in Table 5 by changing the polycondensation reaction time.

The characteristics of the copolyester thus obtained, spinning conditions and the characteristics of the copolyester fiber thus obtained are shown in Table 5.

TABLE 5

| | Characteristics of the copolyester | | Spinning condition | |
|---|---|---|---|---|
| No. | Polymerization degree | Melting point (°C.) | Back pressure of spinneret (Kg/cm$^2$) | Shear stress (dyne/cm$^2$) |
| 21 | 70 | 253 | 50 | 0.75 × 10$^7$ |
| 22 | 82 | 253 | 62 | 0.93 |
| 23 | 91 | 253 | 77 | 1.16 |
| 24 | 100 | 252 | 95 | 1.43 |
| 25 | 113 | 252 | 112 | 1.69 |

| | Characteristics of the copolyester fiber | | | | |
|---|---|---|---|---|---|
| No. | Polymerization degree | tenacity (g/d) | elongation (%) | dyeability (%) | light resistance (grade) | alkali resistance (g/d) |
| 21 | 68 | 3.7 | 34 | 60 | 4.0 | 2.8 |
| 22 | 80 | 4.1 | 35 | 59 | 4.0 | 3.2 |
| 23 | 88 | 4.3 | 36 | 58 | 4.0 | 3.4 |
| 24 | 96 | 4.1 | 35 | 57 | 4.0 | 3.2 |
| 25 | 105 | 3.6 | 33 | 56 | 4.0 | 2.7 |

Remarks:
(1) Shear rate was 5800 sec$^{-1}$, spinning draft ratio was 100 in Example 3.
(2) The copolyester of experiment No. 25 was obtained by polycondensing the copolyester of experiment No. 24 in solid state.

In Table 5, the copolyester fibers manufactured according to the present invention are those of experiment Nos. 22, 23 and 24, which have a polymerization degree in the range of from 80 to 96, tenacity of not less than 4.0 g/d, and are excellent in dyeability, in light resistance and in alkali resistance.

On the other hand, when the polymerization degree of the fiber obtained was 68, its tenacity was only 3.7 g/d (less than 4.0 g/d) and its alkali resistance was unsatisfactory (experiment No. 21).

Further, when the polymerization degree of the fiber obtained was 103, the shear stress was unacceptably high and therefore the tenacity was only 3.6 g/d (not more than 4.0 g/d) and its alkali resistance was unsatisfactory.

COMPARATIVE EXAMPLE 1

A copolyester fiber was obtained in the same way as that described in Example 1 except that the quantity of copolymerized AD was 2.0 mol % based on acid component, and the quantity of added glycol compound was 0. The intrinsic viscosity of the copolyester thus obtained was 0.56 and the melting point was 254° C. The polymerization degree of the copolyester fiber obtained was 85, the tenacity was 4.1 g/d, the elongation was 33%, the dyeability was 45%, the light resistance was 4.0 grade, and the alkali resistance was 3.1 g/d.

The copolyester fiber obtained according to Comparative Example 1 had a tenacity of greater than 4.0 g/d, and was excellent in light resistance and in alkali resistance, but its dyeability was low.

EXAMPLE 4

An undrawn yarn was spun from the copolyester of experiment No. 2 in Example 1 under the conditions shown in Table 6. The undrawn yarn thus obtained was drawn under the same conditions as those described in Example 1 to obtain a drawn fiber of 75 deniers/48 filaments.

The characteristics of the drawn fiber and the spinning conditions are shown in Table 6.

EXAMPLE 6

TABLE 6

|  | Experiment number | | | | | |
| --- | --- | --- | --- | --- | --- | --- |
|  | 26 | 27 | 28 | 29 | 30 | 31 |
| Hole shape of spinneret | round | round | round | round | round | round |
| Hole diameter of spinneret (mm) | 0.27 | 0.27 | 0.18 | 0.35 | 0.55 | 0.27 |
| Hole depth of spinneret (mm) | 0.54 | 0.54 | 0.30 | 1.05 | 2.20 | 0.27 |
| Mass output rate per single hole (g/min · hole) | 0.49 | 0.49 | 0.49 | 0.49 | 0.49 | 0.49 |
| Spinning temperature (°C.) | 300 | 290 | 300 | 300 | 300 | 300 |
| Spinning velocity (m/min) | 1200 | 1200 | 1200 | 1200 | 1200 | 1200 |
| Shear rate (sec$^{-1}$) | 3600 | 3600 | 1200 | 1600 | 420 | 3600 |
| Shear stress (dyne/cm$^2$) | $0.9 \times 10^7$ | $1.3 \times 10^7$ | $1.8 \times 10^7$ | $0.56 \times 10^7$ | $0.3 \times 10^7$ | $0.9 \times 10^7$ |
| Back pressure of spinneret (Kg/cm$^2$) | 73 | 105 | 123 | 70 | 50 | 37 |
| Spinning draft ratio | 120 | 120 | 80 | 160 | 270 | 120 |
| Tenacity (g/d) | 4.3 | 3.7 | 3.6 | 4.3 | 3.8 | 3.8 |
| Elongation (%) | 35 | 33 | 35 | 36 | 33 | 34 |

In Table 6, the copolyester fibers manufactured according to the present invention are those of experiment Nos. 26 to 29, which have the high tenacity.

On the other hand, when the shear rate was only 1200 (experiment No. 28), the tenacity was only 3.6 g/d (less than 4.0 g/d), when shear stress was as high as $1.3 \times 10^7$ dyne/cm$^2$ (experiment No. 31), the tenacity was only 3.8 g/d (less than 4.0 g/d), and when the spinning draft ratio was as high as 270 (experiment No. 30), the tenacity was only 3.8 g/d (less than 4.0 g/d).

EXAMPLE 5

An undrawn yarn was spun from the copolyester of experiment No. 2 in Example 1 under the conditions shown in Table 7. The undrawn yarn thus obtained was drawn under the same conditions as those described in Example 1 to obtain drawn fiber of 75 denier/36 filaments.

The characteristics of the drawn fiber and spinning conditions are shown in Table 7.

The copolyester fiber of experiment No. 32 in Example 5 was woven into a circular knitted fabric, and was alkaline scoured to a weight loss of 20% based on the copolyester fiber and then dyed. The brightness and depth of colour on the fabric were measured. Brightness was measured by judgement with the naked eye in the sunlight.

A sufficiently acceptable silk-like luster was observed on this fabric, and the depth of colour was 15.4. Furthermore the knitted fabric having excellent brightness and depth of colour also had good hand.

This result shows that polyester fibers embodying the present invention are suitable for silky fabrics.

EXAMPLE 7

The copolyester of experiment No. 2 in Example 2 was spun under the conditions shown in Table 8. In this case the spinning draft ratio was 120, shear rate was 3500 sec$^{-1}$, back pressure of the spinneret was 50 Kg/cm$^2$ and shear stress was $0.87 \times 10^7$ dyne/cm$^2$.

TABLE 7

|  | Experiment number | | | | | |
| --- | --- | --- | --- | --- | --- | --- |
|  | 32 | 33 | 34 | 35 | 36 | 37 |
| Hole shape of spinneret | tri lobule | tri lobule | tri lobule | tri lobule | tri lobule | penta lobule |
| Hole width of slit of spinneret (mm) | 0.13 | 0.13 | 0.08 | 0.26 | 0.13 | 0.12 |
| Hole length of slit of spinneret (mm) | 0.276 | 0.276 | 0.20 | 0.55 | 0.276 | 0.24 |
| Hole depth of spinneret (mm) | 0.60 | 0.60 | 0.30 | 2.40 | 0.24 | 0.60 |
| Mass output rate per single hole (g/min hole) | 0.74 | 0.74 | 0.74 | 0.74 | 0.74 | 0.74 |
| Spinning temperature (°C.) | 300 | 280 | 300 | 300 | 300 | 300 |
| Spinning velocity (m/min) | 1100 | 1100 | 1100 | 1100 | 1100 | 1100 |
| Shear rate (sec$^{-1}$) | 4500 | 4500 | 16000 | 560 | 4500 | 3600 |
| Shear stress (dyne/cm$^2$) | $0.72 \times 10^7$ | $1.55 \times 10^7$ | $1.52 \times 10^7$ | $0.22 \times 10^7$ | $0.72 \times 10^7$ | $0.65 \times 10^7$ |
| Back pressure of spinneret (Kg/cm$^2$) | 67 | 145 | 118 | 42 | 27 | 66 |
| Spinning draft ratio | 100 | 100 | 70 | 270 | 100 | 90 |
| Tenacity (g/d) | 4.3 | 3.6 | 3.8 | 3.6 | 3.7 | 4.2 |
| Elongation (%) | 35 | 34 | 33 | 37 | 36 | 35 |

In Table 7, the copolyester fibers manufactured according to the present invention are those of experiment Nos. 32 and 37, which have the high tenacity. On the other hand, when shear rate was as high as 16,000 (experiment No. 34), the tenacity was only 3.8 g/d (less than 4.0 g/d), when the shear stress was as high as $1.55 \times 10^7$ dyne/cm$^2$ (experiment No. 33), the tenacity was only 3.6 g/d (less than 4.0 g/d). Furthermore, when the back pressure of the spinneret was only 27 Kg/cm$^2$ (experiment No. 36), the tenacity was only 3.7 g/d (less than 4.0 g/d), and when the spinning draft ratio was as high as 270 (experiment No. 35), the tenacity was only 3.6 g/d (less than 4.0 g/d).

TABLE 8

| | |
| --- | --- |
| Hole shape of spinneret | round |
| Hole diameter of spinneret | 0.23 mm |
| Hole depth of spinneret | 0.30 mm |
| Mass output rate per single hole | 0.30 g/min. hole |
| Spinning temperature | 300° C. |
| Spinning velocity | 1100 m/min |

The undrawn yarn thus obtained was drawn in the usual way to obtain drawn fiber of 75 denier/72 filaments. The characteristics of the fiber thus obtained, such as tenacity and alkali resistance were good.

The depth of colour on a circular knitted fabric manufactured from this fiber was 15.8, and was better than that of a circular knitted fabric manufactured from a conventional polyester fiber of which the fiber is also 75 denier/72 filaments.

In this case the depth of colour was measured after alkaline scouring to a weight loss of 20%.

Furthermore, this knitted fabric having excellent depth of colour also had good hand.

EXAMPLE 8

A slurry of inert inorganic microfine particles having the characteristics shown in Table 9 was prepared by mixing 5 parts of the inert inorganic microparticles and 2.5 parts of tetraethylammonium hydroxide solution in which the concentration of tetraethyl ammonium hydroxide was 20 weight %, with 92.5 parts of ethylene glycol, and stirring the mixture in an Ultra Turrax T45Dx (Janke & Kunkel Co. Ltd) for 30 min. at 1000 rpm. Thereafter, 19.4 Kg of dimethyl terephthalate, 12.2 Kg of ethylene glycol, 517 g of AD (1.7 mol % based on total acid component) and the above-mentioned inert inorganic microfine particle slurry in an amount by weight of 0.5% based on that of the polyester obtained was placed in an ester-exchange reactor. The ester-exchange reaction was carried out by elevating the temperature from 140° C. to 235° C. in 4 hours at atmospheric pressure with stirring, while distilling away the by-produced methanol. To this reaction system, 8.3 g of trimethyl phosphate, 7.8 g of $Sb_2O_3$, 19.4 g of Irganox 1010" (Ciba-Geigy Co. Ltd.) (which has the function of providing oxidation resistance) were added, and the pressure of the reaction system was gradually reduced to 500 mmHg, and 3.2 Kg of ethylene glycol were distilled.

The resulting product was transferred into a polycondensation tank at 240° C. Then 208 g of polyethylene glycol having a molecular weight of 600 (1.0 weight percent based on the polyester obtained) was added, the inside temperature was elevated from 240° C. to 280° C. in 2 hours, the pressure of the reaction system was gradually reduced to 1 mmHg in an hour. Thereafter, the polycondensation reaction was conducted for 2 hours at 280° C. and not more than 1 mmHg to obtain a copolyester having the intrinsic viscosity shown in Table 9.

TABLE 9

| | Inert inorganic microfine particle | | Characteristics of the obtained copolyester-intrinsic viscosity |
|---|---|---|---|
| No. | Type | the average diameter (mµ) | |
| 38 | silica powder | 7 | 0.57 |
| 39 | " | 16 | 0.57 |
| 40 | " | 40 | 0.57 |
| 41 | " | 80 | 0.56 |
| 42 | " | 120 | 0.57 |
| 43 | Silica A* (20) | 16 | 0.57 |
| 44 | Silica A* (40) | 16 | 0.57 |
| 45 | Silica A* (75) | 16 | 0.57 |
| 46 | Silica B** (75) | 16 | 0.57 |
| 47 | Silica sol | 20 | 0.57 |
| 48 | " | 40 | 0.56 |
| 49 | " | 120 | 0.56 |
| 50 | Alumina | 20 | 0.57 |
| 51 | Calcium carbonate | 80 | 0.57 |

TABLE 9-continued

| | Inert inorganic microfine particle | | Characteristics of the obtained copolyester-intrinsic viscosity |
|---|---|---|---|
| No. | Type | the average diameter (mµ) | |
| 52 | " | 1000 | 0.57 |

*silica A represents silica having silanol groups on the surface which are reacted with a compound having a dimethyl silyl group.
**silica B represents silica having silanol groups on the surface which are reacted with a compound having a diethyl silyl group.
In experiment Nos. 43, 44, 45 and 46, the figures in parentheses represent the reaction weight percent of the silanol groups on the silica surface with the compound having the dialkyl silyl group.

This copolyester was then dried and was spun under the conditions shown in Table 10. In addition, the spinning draft ratio was 100, shear rate was 5800 sec$^{-1}$, back pressure of the spinneret was in the range of from 73 to 86 Kg/cm$^2$ and shear stress was in the range of from $1.1 \times 10^7$ to $1.3 \times 10^7$ dyne/cm$^2$.

TABLE 10

| Hole shape of spinneret | round |
|---|---|
| Hole diameter of spinneret | 0.27 mm |
| Hole depth of spinneret | 0.44 mm |
| Mass output rate per single hole | 0.65 g/min hole |
| Spinning temperature | 300° C. |
| Spinning velocity | 1100 m/min. |

The undrawn yarn thus obtained was then drawn in the usual way to obtain drawn fibers of 75 denier/36 filaments. The characteristics of the fiber, namely tenacity, elongation, polymerization degree, alkali resistance and the depth of colour were measured and are shown in Table 11. In the case of Example 8, the depth of colour was measured for a circular knitted fabric alkaline scoured to a weight loss of 20% based on the copolyester fiber.

TABLE 11

| No. | tenacity (g/d) | elongation (%) | polymerization degree | alkali resistance (g/d) | depth of colour |
|---|---|---|---|---|---|
| 38 | 4.2 | 35 | 85 | 3.1 | 13.6 |
| 39 | 4.2 | 36 | 85 | 3.1 | 13.6 |
| 40 | 4.2 | 33 | 86 | 3.1 | 13.9 |
| 41 | 4.1 | 38 | 84 | 3.0 | 14.2 |
| 42 | 4.2 | 35 | 86 | 3.1 | 14.5 |
| 43 | 4.2 | 34 | 85 | 3.1 | 13.5 |
| 44 | 4.3 | 33 | 86 | 3.2 | 13.4 |
| 45 | 4.2 | 34 | 85 | 3.1 | 13.4 |
| 46 | 4.2 | 35 | 85 | 3.1 | 13.3 |
| 47 | 4.3 | 33 | 86 | 3.2 | 13.4 |
| 48 | 4.1 | 36 | 84 | 3.0 | 13.7 |
| 49 | 4.1 | 37 | 84 | 3.0 | 14.4 |
| 50 | 4.1 | 37 | 85 | 3.1 | 13.9 |
| 51 | 4.2 | 34 | 85 | 3.1 | 14.2 |
| 52 | 4.2 | 34 | 86 | 3.1 | 14.5 |

As can be seen from Tables 9 and 11, the copolyester fibers including the inert inorganic microfine particle having an average diameter of no more than 100 mµ are excellent in depth of colour.

Further, on the surface of fiber for which the depth of colour was measured, a large number of recesses parallel to the fiber axis were observed.

EXAMPLE 9

A copolyester fiber was obtained in the same way as that described in Example 8 except that the inert inorganic microfine particles were of a silica having silanol groups on the surface which were reacted with dimethyl dichloro silane by the weight of 75%, and the inert inorganic microfine particles were added in the amounts shown in Table 12.

The tenacity, elongation and the depth of colour were then measured in the same way as that described in Example 8. The results of this measurement are shown in Table 12.

TABLE 12

| No. | quantity of added inert inorganic microfine particle (weight %) | tenacity (g/d) | elongation (%) | depth of colour |
| --- | --- | --- | --- | --- |
| 53 | 0 | 4.4 | 35 | 14.5 |
| 54 | 0.1 | 4.3 | 36 | 13.9 |
| 55 | 1.0 | 4.2 | 35 | 12.9 |
| 56 | 4.0 | 4.1 | 34 | 13.7 |
| 57 | 5.0 | 3.9 | 36 | 14.8 |

It can be seen from Table 12 that the copolyester fibers including the inert inorganic microfine particles in an amount by weight of from 0.1 to 4.0% based on the copolyester fibers (experiment Nos. 54, 55 and 56) have the high tenacity and are excellent in depth of colour.

On the other hand, the copolyester fiber including the inert inorganic microfine particles in an amount by weight as high as 5.0% (experiment No. 57) had low tenacity and provided a fabric having poor depth of colour.

Further, the copolyester fiber not including the inert inorganic microfine particles (experiment No. 53) gave a fabric having poor depth of colour. Furthermore, on the surface of fiber obtained in experiment Nos. 54, 55 and 56, for which the depth of colour was measured, a large number of recesses parallel to the fiber axis were observed.

EXAMPLE 10

The copolyester fiber obtained in experiment No. 45 in Example 8 was woven into circular knitted fabrics, and these fabrics were alkaline scoured. The weight loss in this alkaline scouring was changed so as to be as shown in Table 13. The tenacity and the elongation of the alkaline scoured copolyester fiber and the depth of colour are shown in Table 13.

TABLE 13

| No. | weight loss on alkaline scouring (weight % based on the copolyester fiber) | Tenacity (g/d) | elongation (%) | depth of Colour |
| --- | --- | --- | --- | --- |
| 58 | 1 | 4.1 | 30 | 14.3 |
| 59 | 5 | 3.9 | 28 | 13.9 |
| 60 | 30 | 3.5 | 29 | 13.1 |
| 61 | 40 | 3.1 | 25 | 13.1 |
| 62 | 50 | 2.7 | 25 | 13.1 |

It can be seen from Table 13 that whether the weight loss of copolyester fiber on alkaline scouring was 5, 30 or 40 weight % based on the copolyester fiber, the fiber had adequate tenacity and was excellent in depth of colour.

We claim:

1. A polyester fiber having a tenacity of at least 4.0 g/d which fiber comprises a copolyester having a degree of polymerization of from 80 to 100, the copolyester including an acid component and a glycol component, 1.0 to 2.0 mol percent of said acid component being metal sulfoisophthalic residues, and 0.5 to 1.9 weight percent of the copolyester being glycol residues provided by a glycol having a molecular weight of from 400 to 6000.

2. A polyester fiber according to claim 1, wherein the glycol is a polyalkylene glycol of the formula, wherein A is selected from $C_lH_{2l+1}O$ and OH, l is an integer of from 1 to 10, n is an integer of from 2 to 5 and m is an integer of from 3 to 100.

3. A polyester fiber according to claim 1, wherein the remaining acid component of the copolyester is derived mainly from terephthalic acid.

4. A polyester fiber according to claim 1, wherein the glycol component is derived mainly from a low molecular weight glycol selected from ethylene glycol and 1, 4 butane diol.

5. A polyester fiber according to claim 1 wherein the metal sulfoisophthalic residues are provided by a compound which has the formula wherein M is an alkali metal and each of A and A' are, independently of one another, selected from the group consisting of hydrogen, aliphatic hydrocarbon and $(CH_2)_xOH$, wherein x is at least 2.

6. A polyester fiber according to claim 1, which has a cross-section selected from trilobular, quadrilobular and pentalobular cross-sections.

7. A polyester fiber according to claim 1, which is formed from a copolymer composition additionally including from 0.1 to 4 weight percent of inert inorganic microfine particles having an average diameter of no more than 100 millimicrons.

8. A method for producing a polyester fiber, which method includes spinning a copolyester having a degree of polymerization of from 82 to 105, the copolyester including an acid component, and a glycol component, 1.0 to 2.0 mol percent of said acid component being metal sulfoisophthalic residues and 0.5 to 1.9 weight percent of the copolyester being glycol residues provided by a glycol having a molecular weight of from 400 to 6000 which spinning is effected by a spinneret under the following conditions, Shear rate $(\dot{\gamma}) \leq 10^4 \sec^{-1}$
Spinning draft ratio $\leq 250$
Back pressure of spinneret $\geq 40$ kg/cm$^2$
Shear stress $(\zeta) \leq (Q+0.7) \times 10^7$ dyne/cm$^2$
wherein Q is the mass output rate per single hole (g/min), and thereafter drawing the resultant fibers.

9. A method according to claim 8, wherein the glycol of the copolyester is a polyalkylene glycol of the formula wherein A is selected from $C_lH_{2l+1}O$ and OH, is an integer of from 1 to 10, n is an integer of from 2 to 5, and m is an integer of from 3 to 100.

10. A method according to claim 8, wherein the cross-section of the spinneret selected trilobular, quadrilobular and pentalobular cross sections and the shear stress is not more than $(0.43Q+0.64)\times 10^7$ dyne/cm², wherein Q is as defined in claim 8.

11. A method according to claim 8 which includes the preliminary step of providing a composition containing the copolyester, the composition additionally containing from 0.1 to 4 percent by weight of the composition of inert inorganic microfine particles having an average diameter of no more than 100 millimicron.

12. A method according to claim 11, which includes the subsequent step of alkaline scouring the resultant fiber so as to provide recesses in the fiber surface.

* * * * *